Patented May 2, 1950

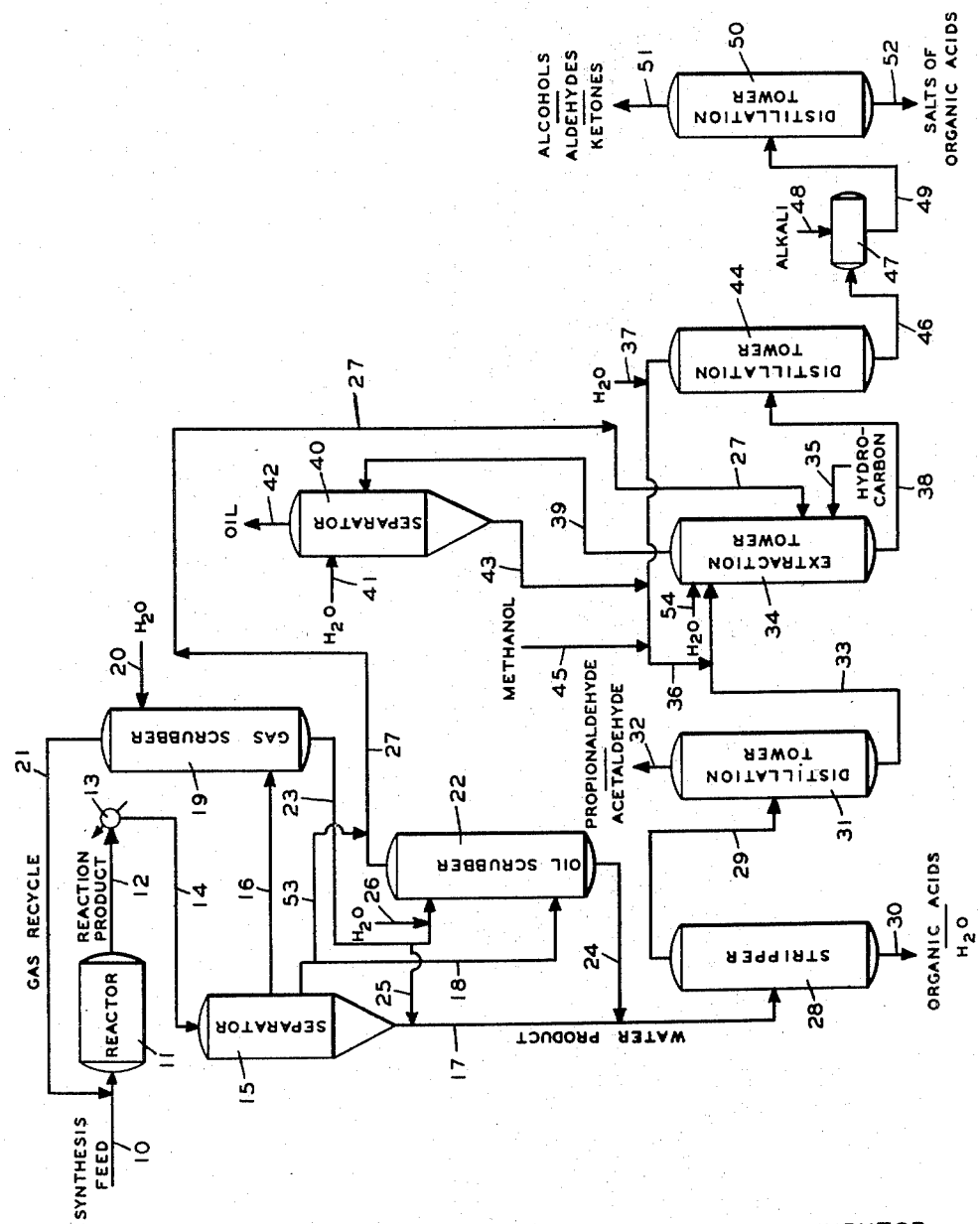

2,505,752

UNITED STATES PATENT OFFICE 2,505,752

SEPARATION OF ORGANIC COMPOUNDS

William P. Burton, Orange, N. J., assignor to The M. W. Kellogg Company, Jersey City, N. J., a corporation of Delaware Application June 19, 1947, Serial No. 755,654

24 Claims. (Cl. 260—450)

This invention relates to the separation of organic compounds and relates more particularly to the separation of organic compounds from the reaction product obtained in the reduction of oxides of carbon with hydrogen in the presence of a catalyst at elevated temperatures. Still more particularly, the invention relates to an improved process for the separation and recovery of useful oxygenated organic compounds and hydrocarbons obtained from the condensation of reactor gases produced in the catalytic hydrogenation of oxides of carbon.

In the hydrogenation of oxides of carbon in the presence of a catalyst at elevated temperatures, a reaction product is obtained in the form of reactor outlet gases at temperatures varying between about 300° F. to about 700° F. and containing water, hydrocarbons and oxygenated organic compounds comprising organic acids, alcohols, aldehydes, ketones, and esters. These gases are passed through one or more condensation zones in which they are cooled to temperatures within the range from about 40° F. to 150° F. to effect separation of a condensate, this condensate ultimately separating into an aqueous phase and an oil phase. Both phases comprise oxygenated organic compounds, those of lower molecular weight tending to remain in the aqueous phase while those of higher molecular weight tend to remain in the oil or non-aqueous liquid phase.

The present invention is particularly directed to a process, as more fully hereinafter described, for the separation and recovery of hydrocarbons and oxygenated organic compounds present in the aqueous phase and oil phase obtained from the condensation of reactor gases in the aforementioned catalytic hydrogenation of oxides of carbon. In general, the invention broadly comprises first scrubbing remaining uncondensed gases (following the aforementioned phase separation), with a polar solvent for oxygenated organic compounds, as more fully hereinafter described, to obtain an extract comprising oxygenated organic compounds and a raffinate of uncondensed gases comprising vaporized hydrocarbons. The gas thus obtained is recycled to the synthesis feed, and the extract is employed in scrubbing the aforementioned oil phase to obtain a second extract comprising water-soluble oxygenated organic compounds. This second extract is next combined with the aforementioned aqueous phase and the combined streams are transferred to an alcohol stripper, wherein organic acids and a major portion of water present are separated from alcohols and other non-acidic oxygenated organic compounds and are removed as bottoms.

Aldehydes, boiling not higher than propionaldehyde, are next separated from non-acidic compounds comprising the overhead from the alcohol stripper, and the raffinate obtained from the aforementioned scrubbing of the oil phase is subjected to solvent extraction with the aforementioned nonacidic compounds (free of aldehydes boiling not higher than propionaldehyde), as the solvent, in order to extract oxygenated chemicals from the scrubbed oil. This extraction with non-acidic compounds as the solvent is an essential feature of the invention. The extract thus obtained, is given a wash-oil treatment for the removal of heavy hydrocarbons and is next subjected to distillation wherein methanol, together with any dissolved light hydrocarbons, are taken overhead as methanol-hydrocarbon azeotropes, and recycled to the last-mentioned extraction step. The hydrocarbon-free bottoms obtained from the above-mentioned distillation are next treated with alkali to effect neutralization of acids and saponification of esters present. The acid-free oxygenated organic chemicals are then separated from the salts of organic acids produced by the aforementioned neutralization, and the mixture of non-acidic oxygenated organic chemicals thus separated may be subjected to further treatment for the recovery of individual components, in the manner known to those skilled in the art. The separated salts of the organic acids may be separately subjected to suitable processing for the recovery of individual acids, in the manner known to those skilled in the art and outside the scope of the present process.

It is an object of this invention to provide an improved process for the separation of hydrocarbons, organic acids, alcohols, aldehydes, ketones, and esters from mixtures thereof.

Another object of the invention is to provide an improved process for the separation of hydrocarbons and oxygenated organic compounds obtained from the condensation of reactor gases produced in the catalytic hydrogenation of oxides of carbon.

Other objects and advantages inherent in the present invention will be apparent from the following more detailed disclosure.

The accompanying drawing illustrates diagrammatically one form of the apparatus employed and capable of carrying out one embodiment of the process of my invention. While the invention will be described in detail by reference to one embodiment of the process employing the apparatus illustrated in the drawing, it should be noted that it is not intended that the invention be limited to the embodiment as illustrated, but is capable of other embodiments which may extend beyond the scope of the apparatus illustrated. Pumps, compressors, valves, and other mechanical elements necessary to effect the transfer of liquids and vapors and to maintain the conditions of temperature and pressure necessary to carry out the function of the apparatus, are omitted in order to simplify the description. It will be understood, however, that much equipment of this nature is necessary and will be supplied by those skilled in the art.

Referring to the drawing, the aforementioned synthesis feed comprising a reaction mixture of hydrogen and an oxide of carbon, at varying mol ratios such as 2:1, respectively, is supplied through line 10 and transferred through this line to a synthesis reaction vessel, represented in the drawing by reactor 11. In reactor 11 the reaction mixture is contacted with a hydrogenation catalyst, such as a reduced iron or cobalt catalyst, at temperatures varying between about 300° F. to 700° F., and at pressures varying between about atmospheric pressure to 500 pounds per square inch, and is carried out according to conventional fixed bed or fluid bed operations. The resulting reaction product obtained from reactor 11 is withdrawn through line 12. This product is in the vapor form, substantially as it comes from the reactor within the aforementioned temperature range, containing water, hydrocarbons and oxygenated organic compounds comprising organic acids, alcohols, aldehydes, ketones and esters, and is first cooled to condense substantially large quantities of normally liquid components. Conveniently, condensation may be effected in a plurality of cooling stages which are represented diagrammatically in the drawing by cooler 13 with which line 12 connects. From cooler 13, the resulting mixture of condensate and uncondensed gases passes through line 14 to a separator 15. In the latter, uncondensed gases are withdrawn through line 16 and the condensate separates as a lower aqueous phase and an upper oil phase. The aqueous phase is drawn off from the bottom of separator 15 through line 17, and the oil phase is drawn off at an intermediate point through line 18. It should be noted, that apparatus embodying more than one separation stage may be employed if desired; for example, primary and secondary separation stages may be introduced, operating successively and respectively at temperatures of about 150° F. and 100° F.

The gases separated in separator 15 are passed through line 16 to a low point in a suitable scrubbing vessel 19. In this gas scrubber, the gases are intimately contacted with a polar solvent for oxygenated organic compounds in order to absorb the more volatile oxygenated organic compounds in the solvent. The polar solvent selected for the above gas scrubbing operation may be one such as water, or an aqueous solution containing oxygenated organic compounds, such as an aqueous solution of one or more water-soluble organic acids. In addition, polar solvents of the glycol type may be employed, such as an aqueous or anhydrous glycol. Where it is desired to use a glycol as the solvent treating agent in the aforementioned gas scrubbing operation, ethylene glycol has been found to be overall generally suitable, although other glycol solvents may be advantageously employed such as diethylene glycol, isopropylene glycol, triethylene glycol, trimethylene glycol, and the like. The solvent selected, represented in the drawing by water, is introduced into scrubber 19 through line 20 and absorbs the more volatile oxygenated organic compounds as described above. The remaining gas, essentially free of oxygenated organic compounds and comprising vaporized light hydrocarbons, is withdrawn as an overhead raffinate of uncondensed gases, and recycled through line 21 to the synthesis feed in line 10, with which line 21 connects.

The oil phase separated in separator 15, is transferred through line 18 to a low point in an oil scrubber 22. In scrubber 22 the oil is contacted intimately with a solvent for the oxygenated organic compounds which are dissolved in the oil and which are relatively more soluble in the solvent. The solvent employed for this purpose, conveniently may be the solvent, such as water, employed for scrubbing in gas scrubber 19, which is transferred as the extract obtained from gas scrubber 19, to an upper part of oil scrubber 22 through line 23. The scrubbing water, containing dissolved oxygenated organic compounds, is withdrawn from the bottom of oil scrubber 22, as a second extract through line 24, which conveniently connects with line 17 for combining the scrubbing water with the aqueous phase withdrawn from separator 15. Where so desired, it is possible to transfer the extract from gas scrubber 19 in line 23, through line 25, with which line 23 connects, directly into line 17 to combine with the aqueous phase withdrawn from separator 15, and thus by-passing oil scrubber 22. Where this alternative step is employed, fresh quantities of the solvent treating agent, such as water, are introduced into oil scrubber 22 through line 26, which connects with line 23 entering scrubber 22, for scrubbing the oil as previously described. The scrubbed oil raffinate from oil scrubber 22, comprising essentially a mixture of organic acids, alcohols, esters, aldehydes, ketones and hydrocarbons is withdrawn overhead through line 27 for further use in the process hereinafter described. At this point, it should be noted that where so desired, the oil scrubbing step in scrubber 22 may be eliminated and the oil phase withdrawn from separator 15 through line 18 may be transferred directly into line 27 through line 53 for further use in the process hereinafter described.

As described above, the aqueous product in line 17 contains low molecular weight oxygenated organic compounds, which comprise chiefly light alcohols and light organic acids. In addition, relatively smaller quantities of aldehydes, ketones, esters and heavier organic acids are also present. This water product is next transferred through line 17 to a distillation tower 28 which functions as an alcohol stripper. In tower 28 the mixture of oxygenated organic compounds is heated under proper operating conditions of temperature and pressure effective to distill overhead alcohols, aldehydes, ketones, esters, and minor quantities of water which are withdrawn through line 29. Bottoms obtained from tower 28, comprising aqueous light organic acids, are withdrawn through line 30 for further use or treatment outside the scope of the present process.

The overhead from tower 28, comprising a mixture of light alcohols, aldehydes, ketones and esters, is transferred through line 29 to a distillation tower 31. In tower 31 the mixture is heated under proper operating conditions of temperature and pressure effective to distill overhead acetaldehyde and propionaldehyde which are the lowest boiling components of the mixture and which are withdrawn through line 32 for further use outside the scope of the present process. Bottoms from tower 31, comprising a mixture of light alcohols, ketones, esters, aldehydes, higher boiling than propionaldehyde, traces of organic acids and water, are withdrawn through line 33 for further use in the process hereinafter described.

As described above, the scrubbed oil raffinate from oil scrubber 22, comprising essentially a mixture of organic acids, alcohols, esters, aldehydes, ketones and hydrocarbons, is withdrawn overhead through line 27. This mixture is next transferred to a low point in an extraction tower 34. In tower 34 the above mixture is subjected to intimate countercurrent contact with the mixture of oxygenated organic compounds, comprising the bottoms withdrawn from tower 31 through line 33 and transferred through this line to an upper point in tower 34. The scrubbed oil in line 27 and the mixture of oxygenated organic compounds in line 33 are contacted in tower 34 under conditions effective to absorb in the latter the oxygenated organic compounds present in the oil.

The extract of oxygenated organic compounds thus obtained in tower 34 may contain varying amounts of dissolved heavy hydrocarbons. These hydrocarbons must be removed in order to effect the subsequent recovery of pure alcohols. It has been found that the hydrocarbons tend to concentrate as their homogeneous alcohol azeotropes in the distillation cuts taken between the various alcohols. In such aqueous alcohol solutions, contaminating hydrocarbons can be removed efficiently and economically by means of one or more hydrocarbons functioning as a wash-oil, which hydrocarbons are themselves readily removable. In principle, the process may be considered as one of dilution rather than extraction in that the undesirable hydrocarbons are replaced by one or more of the aforementioned hydrocarbons that may be readily eliminated.

Such a hydrocarbon may be n-pentane which is highly suitable in overall use as applied to the aforementioned process. It should be noted, that the operation is not restricted to the sole use of pentane for the purpose indicated, but that other lighter or heavier hydrocarbons may also be successfully employed, such as butane or heptane. Butane has the advantage of not being known to form an azeotrope with methanol, although it has a higher solubility in aqueous alcohol solutions. On the other hand, it may be desirable to use heavier hydrocarbons as a wash-oil such as hexane, the latter being less soluble than pentane but requiring the stripping of lighter hydrocarbons out of the hexane as well as the stripping of hexane from the heavier hydrocarbons. The choice of a suitable hydrocarbon will be influenced by its solubility, and by its boiling point or the boiling points of its azeotropes with light alcohols. In general, any light hydrocarbon may be employed as the wash-oil for the purpose indicated, which boils below the methanol-acetone azeotrope or which forms a minimum boiling azeotrope with methanol.

The particular hydrocarbon or mixture of hydrocarbons selected as a wash-oil is introduced into tower 34 through line 35 at a point below the introduction of the scrubbed oil through line 27. In order to increase the volume of the mixture of oxygenated organic compounds used as the solvent treating agent in line 33 for efficient extraction, additional methanol may be introduced into line 33 through line 36, with which line 35 connects. For a similar purpose, water may be introduced for admixture with the added methanol in line 36, through line 37 with which line 36 connects. The introduction of methanol and water, in the manner described above, not only affords sufficient volume for efficient extraction, but also accomplishes the result of reducing the solubility of the hydrocarbons in the aforementioned solvent treating agent, introduced into tower 34 through line 33. While the extraction operation in tower 34 may be carried out over a broad range of temperature and pressure or at temperatures and pressures easily obtained, it is preferred to maintain such temperature and pressure conditions that the lighter components such as methanol-hydrocarbon azeotropes do not boil in this tower. The extract obtained from tower 34, comprising a mixture of organic acids, alcohols, esters, aldehydes, ketones, and light hydrocarbons, is withdrawn through line 38 for further treatment in the process hereinafter described. The overhead raffinate comprising a mixture of heavy hydrocarbons and relatively smaller quantities of dissolved oxygenated organic compounds is withdrawn through line 39. This raffinate is next transferred through line 39 to a separator 40. In separator 40 the raffinate is given a water-wash to dissolve any light oxygenated organic compounds present in the oil or hydrocarbon mixture. For this purpose, water is introduced into separator 40 at an upper point through line 41. In separator 40 oil, free of the aforementioned oxygenated chemicals, will separate as an upper phase and is withdrawn overhead through line 42 for further use or treatment outside the scope of the present process. The lower aqueous phase from separator 40 containing light oxygenated chemicals is withdrawn as bottoms through line 43 and transferred through this line into line 33, via line 36, for further use as a component of the solvent treating agent in tower 34 in the process described above. It should be noted that when so desired, as an alternative method for removing light oxygenated organic compounds from the aforementioned raffinate in line 39, additional water may be introduced into tower 34 at a point above which the solvent in line 33 is introduced. Water thus employed may be introduced into tower 34 through line 54, thus also reducing the required quantities of water introduced through line 37, as described above.

As described above, the extract from tower 34 comprises a mixture of organic acids, alcohols, esters, aldehydes, ketones and light hydrocarbons. This extract is next transferred through line 38 to a distillation tower 44 in order to effect removal of the hydrocarbon wash-oil from the stream of oxygenated organic compounds. In tower 44 this mixture is heated under proper operating conditions of temperature and pressure effective to distill overhead methanol-hydrocarbon azeotropes, and additional methanol where so desired, which are withdrawn through line 36 and recycled through this line to combine with the aforementioned solvent treating agent in line 33 for the further use of methanol, for the purpose indicated above. Make-up methanol may be introduced into line 36 through line 45, with which line 36 connects.

The hydrocarbon-free bottoms from tower 44 are withdrawn through line 46. These bottoms, comprising a mixture of organic acids, alcohols, esters, aldehydes, and ketones, are next treated with alkali in order to effect neutralization of organic acids present, and such alkali may be also introduced in increased quantities under suitable conditions of temperature and pressure effective to saponify esters (or to polymerize aldehydes where so desired). For this purpose, bottoms from tower 44 are next transferred through line 46 to a caustic treater 47, in which they are intimately mixed with alkali in a suitable amount introduced through line 48. After the components of the mixture are maintained in intimate contact for a time sufficient to effect the desired neutralization of organic acids, and to effect saponification of esters (and to polymerize aldehydes where so desired), the resulting mixture is withdrawn from treater 47 through line 49. The mixture thus withdrawn from treater 47 comprises an aqueous mixture of salts of organic acids, aldehydes (or aldehyde polymers), alcohols, ketones and excess alkali. This mixture may be next transferred through line 49 to a distillation tower 50. Tower 50 is operated under conditions of temperature and pressure effective to distill overhead a mixture of alcohols, aldehydes, and ketones which are withdrawn through line 51, and may be transferred through this line to any suitable processing steps in order to obtain separation of individual components, in the manner known to those skilled in the art. Bottoms from tower 50, comprising salts of organic acids, aldehyde polymers if present in tower 50, and any excess alkali present, are withdrawn through line 52 and may be also subjected to further processing to convert these salts into their corresponding organic acids in the manner known to those skilled in the art and outside the scope of the present process. At this point, it should be noted that where so desired, bottoms withdrawn from tower 44 through line 46 and comprising a mixture of oxygenated organic compounds as described above, may be subjected to treatment by other processes known to those skilled in the art, for the separation of individual components from the above-indicated mixture.

It will be noted that particular novelty resides in the process of this invention, in that the recovery of all non-acid oxygenated organic compounds from the aforementioned reaction product is facilitated by being treated in one stream and thus eliminating large quantities of costly equipment otherwise necessary when the aforementioned oil and water product streams are treated separately. In addition, it should be noted that the process of the invention makes possible the use of the solvent properties of the water-soluble alcohols, as the solvent treating agent in tower 34, as described above. Another advantage is attained in the use of the aforementioned water-soluble alcohols as the solvent for the above-described extraction in tower 34 of oil-soluble chemicals from hydrocarbons, thus affecting a reduction in the quantities of external solvents that would otherwise be required. Still another advantage of the invention lies in the use of the light hydrocarbon fraction in line 27, permitting the extraction process in tower 34 to take place without heavy hydrocarbons being included in the resulting extract, which would not be removed during the subsequent methanol stripping in tower 44, as hereinbefore described.

To recapitulate, this invention is directed to a process for the separation and recovery of oxygenated organic compounds and hydrocarbons obtained from the condensation of reactor gases in the catalytic hydrogenation of oxides of carbon. However, while the invention has been described as having a particular applicability to the separation of such compounds obtained from the source indicated, it should be noted that the process of the invention is not necessarily restricted to effect the desired separation of the compounds as derived from the aforementioned source. The process of the invention may be also successfully applied to the separation of any mixtures of the aforementioned compounds without regard to the source from which these mixtures may have been derived and without regard to the composition of such mixtures. In this respect, it is possible to introduce such mixtures directly into separator 15, through line 14, for treatment in the process hereinbefore described.

In addition, while a particular embodiment of this invention has been described for purposes of illustration, it should be understood that various modifications and adaptations thereof, which will be obvious to one skilled in the art, may be made within the spirit of the invention as set forth in the appended claims.

Having thus described my invention, what I claim and desire to secure by Letters Patent is:

1. A process for treating the product of hydrogenation of oxides of carbon wherein said product comprises a mixture of hydrocarbons, water-soluble and oil soluble oxygenated organic compounds, said oxygenated compounds comprising organic acids and non-acidic organic compounds, which comprises cooling said product to effect substantial condensation of normally liquid components contained therein to form an oil product liquid phase and a water product liquid phase, separating said phases, separately subjecting said oil product liquid phase to extraction with a polar solvent for oxygenated organic compounds contained in said oil phase to produce a raffinate comprising hydrocarbons and an extract comprising water-soluble oxygenated organic compounds, combining said extract with said water product liquid phase to produce a mixture comprising organic acids and non-acidic organic compounds, and separating acids from non-acidic components contained in said mixture.

2. A process for treating the product of hydrogenation of oxides of carbon wherein said product comprises a mixture of hydrocarbons, water-soluble and oil soluble oxygenated organic compounds, said oxygenated compounds comprising organic acids, aldehydes and other non-acidic organic compounds, which comprises cooling said product to effect substantial condensation of normally liquid components contained therein to form an oil product liquid phase, a water product liquid phase and an uncondensed gas phase, separating said phases, separately subjecting said uncondensed gas phase to scrubbing treatment with a polar solvent for oxygenated organic compounds contained in said uncondensed gas phase to obtain a first extract comprising oxygenated organic compounds and a first raffinate of uncondensed gases comprising vaporized hydrocarbons, separately subjecting the oil product liquid phase to scrubbing treatment with at least a portion of the extract obtained in the first mentioned scrubbing treatment to obtain a second extract comprising water-soluble oxygenated organic compounds and a second raffinate comprising hydrocarbons and oil soluble oxygenated organic compounds, combining said second extract with said water product liquid phase to produce a mixture comprising organic acids and non-acidic organic compounds, and separating acids from non-acidic components contained in said mixture.

3. A process as defined by claim 2 wherein the solvent is water.

4. A process as defined by claim 2 wherein the solvent is a glycol.

5. A process as defined by claim 2 wherein the solvent is ethylene glycol.

6. A process as defined by claim 2 wherein the solvent is diethylene glycol.

7. A process as defined by claim 2 wherein the solvent is an aqueous solution of water-soluble organic acids.

8. A process as defined by claim 2 wherein aldehydes boiling not higher than propionaldehyde are separated from said non-acidic components, and said second raffinate is subjected to extraction treatment with an aqueous solution of a solvent for oxygenated organic compounds contained in said second raffinate to obtain a third raffinate comprising hydrocarbons and a third extract comprising oxygenated organic compounds, solvent and water.

9. A process as defined by claim 8 wherein said last mentioned solvent is an alcohol.

10. A process as defined by claim 8 wherein said last mentioned solvent is methanol.

11. A process as defined by claim 8 wherein said last mentioned solvent is ethanol.

12. A process as defined by claim 8 wherein said last mentioned solvent consists of said non-acidic components, free of aldehydes boiling not higher than propionaldehyde.

13. A process as defined by claim 2 wherein aldehydes boiling not higher than propionaldehyde are separated from said non-acidic components, said second raffinate is subjected to extraction treatment with an aqueous solution of a solvent for oxygenated organic compounds contained in said second raffinate to obtain a third raffinate comprising hydrocarbons and a third extract comprising oxygenated organic compounds, solvent and water, said third raffinate is water-washed to dissolve water-soluble oxygenated organic compounds contained therein, hydrocarbons are separated from said water-washed oxygenated organic compounds, and said separated oxygenated organic compounds are returned to said last mentioned extraction step.

14. A process as defined by claim 2 wherein aldehydes boiling not higher than propionaldehyde are separated from said non-acidic components, said second raffinate is subjected to extraction treatment with an aqueous solution of a solvent for oxygenated organic compounds contained in said second raffinate to obtain a third raffinate comprising hydrocarbons and a third extract comprising oxygenated organic compounds, solvent and water, said third extract is subjected to wash-oil treatment with a hydrocarbon which is readily separable from said oxygenated organic compounds contained in said third extract by distillation, the extract thus obtained is subjected to distillation to obtain a relatively high boiling fraction comprising oxygenated organic compounds and water and a relatively low boiling fraction comprising said solvent, and said low boiling fraction is returned as the solvent to said last mentioned extraction step.

15. A process as defined by claim 14 wherein said high boiling fraction is treated with alkali to convert organic acids contained therein to their alkali salts, and said salts are separated from said high boiling fraction.

16. A process as defined by claim 14 wherein said wash-oil is a hydrocarbon whose boiling range is substantially within the boiling range of said oxygenated organic compounds.

17. A process as defined by claim 14 wherein said wash-oil is a hydrocarbon whose boiling range is substantially below the boiling range of said oxygenated organic compounds.

18. A process as defined by claim 12 wherein said wash-oil is butane.

19. A process as defined by claim 12 wherein said wash-oil is pentane.

20. A process as defined by claim 12 wherein said wash-oil is hexane.

21. A process for treating the product of hydrogenation of oxides of carbon wherein said product comprises a mixture of hydrocarbons, water-soluble and oil soluble oxygenated organic compounds, said oxygenated compounds comprising organic acids, aldehydes and other non-acidic organic compounds, which comprises cooling said product to effect substantial condensation of normally liquid components contained therein to form an oil product liquid phase and a water product liquid phase, separating said phases, separating acids from non-acidic compounds contained in said water product liquid phase to produce a mixture comprising aldehydes and other non-acidic organic compounds, separating aldehydes not higher boiling than propionaldehyde from the mixture thus produced, and subjecting said oil product liquid phase to extraction treatment with the remainder of said last-mentioned mixture to obtain a raffinate comprising hydrocarbons and an extract comprising oxygenated organic compounds.

22. A process for treating the product of hydrogenation of oxides of carbon wherein said product comprises a mixture of hydrocarbons, water-soluble and oil soluble oxygenated organic compounds, said oxygenated compounds comprising organic acids, aldehydes and other non-acidic organic compounds, which comprises cooling said product to effect substantial condensation of normally liquid components contained therein to form an oil product liquid phase and a water product liquid phase, separating said phases, subjecting said oil product liquid phase to scrubbing treatment with a polar solvent for oxygenated organic compounds contained in said oil phase to obtain a first extract comprising water-soluble oxygenated organic compounds and a first raffinate comprising hydrocarbons and oil soluble oxygenated organic compounds, separating acids from non-acidic compounds contained in said water product liquid phase to produce a mixture comprising aldehydes and other non-acidic organic compounds, separating aldehydes not higher boiling than propionaldehyde from the mixture thus produced, and subjecting said first raffinate to extraction treatment with the remainder of said last-mentioned mixture to obtain a second raffinate comprising hydrocarbons and a second extract comprising oxygenated organic compounds.

23. A process for treating the product of hydrogenation of oxides of carbon wherein said product comprises a mixture of hydrocarbons, water-soluble and oil soluble oxygenated organic compounds, said oxygenated compounds comprising organic acids, aldehydes and other non-acidic organic compounds, which comprises cooling said product to effect substantial condensation of normally liquid components contained therein to form an oil product liquid phase and a water product liquid phase, separating said phases, separating acids from non-acidic compounds contained in said water product liquid phase to produce a mixture comprising aldehydes and other non-acidic organic compounds, separating aldehydes not higher boiling than propionaldehyde from the mixture thus produced, subjecting said oil product liquid phase to extraction treatment with the remainder of said last-mentioned mixture to obtain a first raffinate comprising hydrocarbons and a first extract comprising oxygenated organic compounds and hydrocarbons, subjecting said first extract to wash-oil treatment with a hydrocarbon which is readily separable from said oxygenated organic compounds contained in said first extract by distillation to obtain a second extract comprising oxygenated organic compounds and hydrocarbons, and subjecting said second extract to distillation to obtain a relatively low boiling fraction comprising hydrocarbons and a relatively high boiling fraction comprising oxygenated organic compounds.

24. A process for treating the product of hydrogenation of oxides of carbon wherein said product comprises a mixture of hydrocarbons, water-soluble and oil soluble oxygenated organic compounds, said oxygenated compounds comprising organic acids, aldehydes and other non-acidic organic compounds, which comprises cooling said product to effect substantial condensation of normally liquid components contained therein to form an oil product liquid phase and a water product liquid phase, separating said phases, separating acids from non-acidic compounds contained in said water product liquid phase to produce a mixture comprising aldehydes and other non-acidic organic compounds, separating aldehydes not higher boiling than propionaldehyde from the mixture thus produced, subjecting said oil product liquid phase to extraction treatment with the remainder of said last-mentioned mixture to obtain a first raffinate comprising hydrocarbons and a first extract comprising oxygenated organic compounds and hydrocarbons, subjecting said first extract to wash-oil treatment with a hydrocarbon which is readily separable from said oxygenated organic compounds contained in said first extract by distillation to obtain a second extract comprising oxygenated organic compounds and hydrocarbons, subjecting said second extract to distillation to obtain a relatively low boiling fraction comprising hydrocarbons and a relatively high boiling fraction comprising oxygenated organic compounds, treating said relatively high boiling fraction with alkali to convert organic acids contained therein to their alkali salts, and separating said salts from said high boiling fraction.

WILLIAM P. BURTON.

REFERENCES CITED

The following references are of record in the file of this patent:

UNITED STATES PATENTS

| Number | Name | Date |
|---|---|---|
| 1,870,816 | Lewis | Aug. 2, 1932 |
| 2,171,324 | Zetzsche et al. | Aug. 29, 1939 |
| 2,274,750 | Soonksen | Mar. 3, 1942 |

FOREIGN PATENTS

| Number | Country | Date |
|---|---|---|
| 350,502 | Great Britain | June 15, 1931 |
| 446,305 | Great Britain | Apr. 28, 1936 |

OTHER REFERENCES

Koch et al., Brenn. Chemie, 16, 382–387 (1935).